United States Patent [19]

Wainwright

[11] Patent Number: 4,932,709
[45] Date of Patent: Jun. 12, 1990

[54] MINI VAN SEATING COMBINATION

[75] Inventor: John C. Wainwright, Riverview, Mich.

[73] Assignee: Lear Siegler Seating Corporation, Southfield, Mich.

[21] Appl. No.: 443,870

[22] Filed: Nov. 30, 1989

Related U.S. Application Data

[63] Continuation of Ser. No. 290,694, Dec. 27, 1988, abandoned.

[51] Int. Cl.$^5$ ............................................. B60N 2/36
[52] U.S. Cl. ..................................... 296/65.1; 296/69
[58] Field of Search ............... 296/65.1, 66, 69, 68.1; 297/331, 335, 14, 15, 374

[56] References Cited

U.S. PATENT DOCUMENTS

| | | | |
|---|---|---|---|
| 1,467,856 | 9/1923 | Keller | 296/69 X |
| 2,916,325 | 12/1959 | Estes et al. | 296/66 |
| 2,956,837 | 10/1960 | Koplin | 296/66 |
| 4,065,174 | 12/1977 | Yokohama et al. | 296/69 X |
| 4,606,577 | 8/1986 | Hirama et al. | 297/379 X |
| 4,699,418 | 10/1987 | Pavetich | 296/65.1 |
| 4,805,953 | 2/1989 | Yamauchi | 296/65.1 |

FOREIGN PATENT DOCUMENTS

| | | | |
|---|---|---|---|
| 192269 | 10/1957 | Austria | 296/24.1 |
| 2912405 | 10/1979 | Fed. Rep. of Germany | 297/331 |
| 67528 | 4/1983 | Japan | 296/65.1 |
| 8303081 | 9/1983 | PCT Int'l Appl. | 296/65.1 |

Primary Examiner—Margaret A. Focarino
Assistant Examiner—Gary C. Hoge
Attorney, Agent, or Firm—Reising, Ethington, Barnard, Perry & Milton

[57] ABSTRACT

A vehicle seat assembly (10) of the type for moving between an upright seating position and a forwardly folded position. The assembly (10) includes a first seat assembly (24) mounted to a forward seating area (20) of the vehicle floor by a first frame assembly (26). The first frame assembly (16) allows forward folding movement of the first seat (24). The assembly (10) further includes a second seat assembly (40) which overlies the load carrying platform (18) when in the upright seating position. A second frame assembly (42) allows forward pivoting movement of the second seat (40). When the assembly (10) is in the forwardly folded position, a lip (56) on the bottom of the second seat (40) engages a recess (37) on the first seat (24). In this position, the first (24) and second (40) seats are disposed in the forward seating area (20), and the backrest (36) of the first seat (24) and the bottom (50) of the second seat (40) are substantially flush with the load carrying platform.

5 Claims, 3 Drawing Sheets

MINI VAN SEATING COMBINATION

This application is a continuation of application Ser. No. 290,694, filed 12/27/89, now abandoned.

TECHNICAL FIELD

The present invention relates to a vehicle seat assembly of the type for folding between an upright seating position and a forwardly folded position. Specifically, the present invention relates to vehicles seats which when in the upright seating position can carry passengers and in the forwardly folded position can carry loads other than passengers.

BACKGROUND ART

In a vehicle, it is often desirable to provide a forwardly foldable seating assembly for increasing the carge carrying capacity of the vehicle. In vehicles, particularly of the mini-van type having at least three seats, it is further desirable to have the rearmost two seats fold forwardly for carrying large cargo other than people.

The U.S. Pat. No. 4,227,736 to Lebault et al, issued Oct. 14, 1980 discloses a forwardly foldable seating assembly. The assembly includes a first rear seat and a second rear seat. The first and second rear seat fold independently of one another. The second rear seat is located on a raised area of the floor or the load carrying platform of the vehicle. To increase the loading capacity of the vehicle, the first rear seat is forwardly folded to a generally verticla position. The second rear seat is then folded forwardly in such a manner that the back of the rear seat and the bottom thereof form an extension of the load carrying platform. The first area seat does not form an extension of the load carrying platform.

SUMMARY OF THE INVENTION AND ADVANTAGES

According to the present invention, there is provided a vehicle seat assembly of the type to be folded forwardly in a vehicle to increase the load carrying capacity of the vehicle. The assembly comprises a vehicle including front and rear wheels and a floor. The floor includes a raised load carrying platform over the rear wheels and extends rearwardly therefrom. The floor further includes a forward seating area forward of the rear wheels and lower in height than the raised load carrying platform. The assembly further includes first seat means fixedly secured to the forward seating area of the floor for pivoting between an upright seating position and a forwardly folded load carrying position. The first seat means further includes a first lower seating portion and a first upright back support portion. The assembly further includes second seat means fixedly secured on the load carrying platform rearwardly of the first seat means for pivoting between an upright seating position and a forwardly folded position. The second seat means includes a second lower seating portion and second upright back support portion. The assembly is characterized by the first seat means including first frame means for permitting forward folding movement of the first seat means. The assembly is further characterized by the second seat means including second seat frame means for permitting pivoting movement of the second seat means so that both of the first and second seat means are disposed in the forward seating area when each of the first and second seat means are in the forwardly folded position with the back support of the first seat means and the second lower seat portion of the second seat means comprising an extension of the load carrying platform.

Accordingly, there is provided a seating assembly wherein the rearmost two seats of the vehicle having at least three seats fold forwardly and comprises an extension of the load carrying platform of the vehicle for increasing the load carrying capacity of the vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
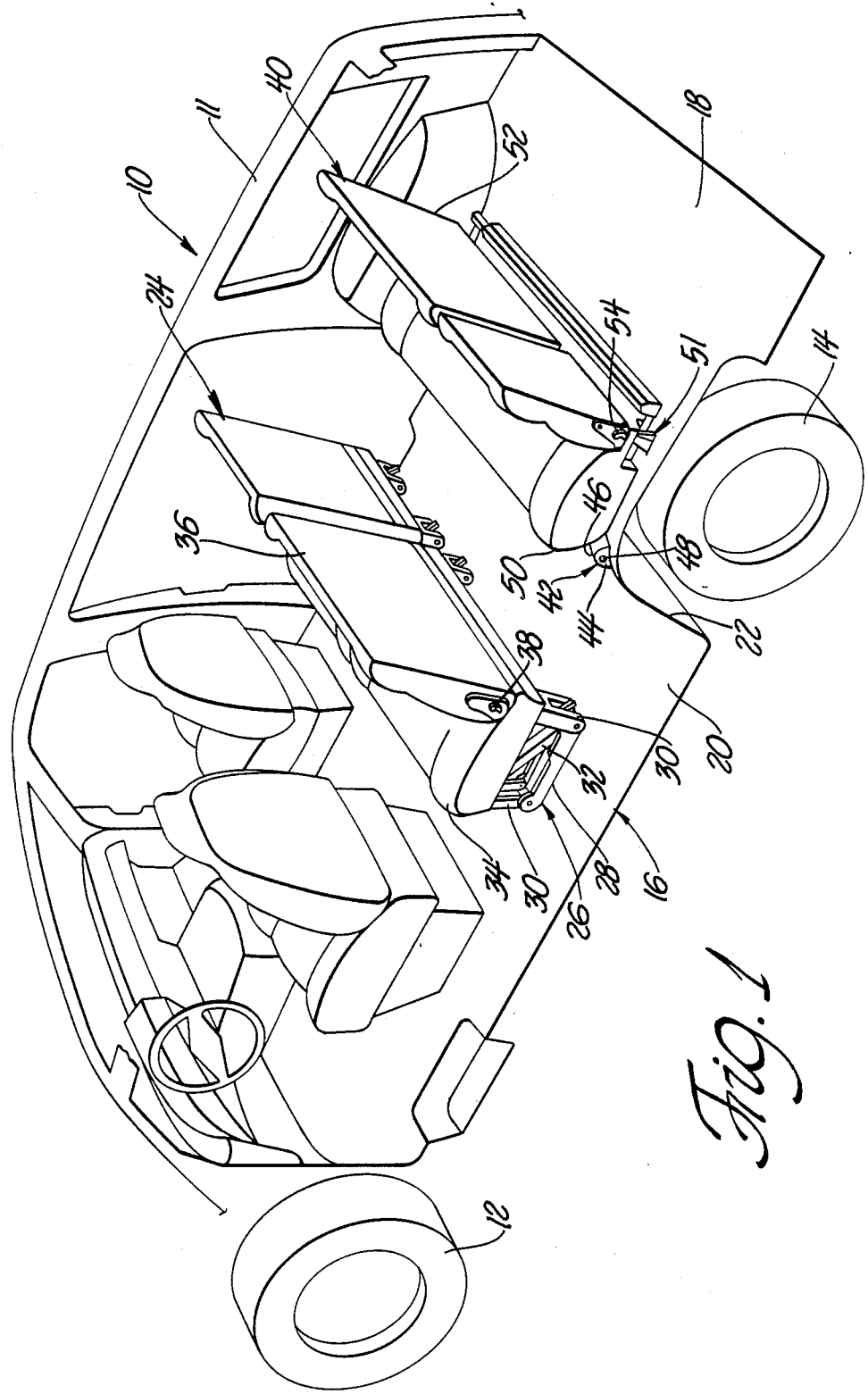
FIG. 1 is a perspective view of a vehicle having a seating assembly made in accordance with the instant invention.

A vehicle seat assembly of the type to be folded forwardly in a vehicle to increase the load carrying capacity of the vehicle is generally shown at 10 in the Figures.

The assembly 10 includes a vehicle 11 having front wheels 12 and rear wheels 14. At least two of the wheels 14, 16 are dirigible so that the vehicle 11 can be maneuvered. The vehicle 11 further includes a floor generally indicated at 16. The floor 16 has a raised load carrying platform 18. The raised load carrying platform 18 of the vehicle floor 12 is located in the vehicle 11 over the rear wheels 14 and extends rearwardly therefrom. The floor 16 further includes a forward seating area 20. The forward seating area 20 is forward of the rear wheels 14 and lower in height relative to the raised load carrying platform 18. The raised load carrying platform 18 and lower seating area 20 of the vehicle floor 16 are interconnected by a substantially vertical wall 22.

The assembly 10 further includes a first seat means or assembly generally indicated at 24. The first seat assembly 24 preferably refers to the first rear seat in the vehicle 11. That is the first seat assembly 24 is located behind the front seat of the vehicle 11. The first seat assembly 24 is fixedly secured to the forward seating area 20 of the vehicle floor 16 and is for pivoting between an upright seating position and a forwardly folded load carrying position. Specifically, the first seat assembly 24 includes a first frame means or assembly generally indicated at 26. The first frame assembly 26 comprises a base 28 which is fixedly secured to the forward seating area 20 of the vehicle floor 16. The base 28 is fixedly secured to the forward seating area 20 by any means well known in the art. The first frame assembly 26 further comprises a pair of support brackets 30 pivotally connected by a pair of pivot pins to the base 28. That is, each support bracket 30 is connected to the base 28 by a pivot pin. The support brackets 30 extend upwardly from the base 28 for supporting the first seat 34, 36 as will be described subsequently. The first frame means 26 further comprises a cross member 32 pivotally connected to the base 28. Further, the cross member 32 is pivotally connected at the end opposite the base to one of the support brackets 30. The cross member 32 is for allowing selective pivoting movement of the support brackets 30 between the upright seating position and forwardly folded position. Specifically, the cross member 32 can be selectively locked in the upright seating position and released, i.e. allowed to move relative to the base 28, for permitting forward folding of the first frame assembly 26. Any locking assembly well known in the art can be used to lock and release the cross member 28. The preferable frame assembly to be used in accordance with the instant invention is more fully described in co-pending application Ser. No. 290,681, filed concurrently herewith assigned to the assignee of the subject invention, and entitled Forwardly Foldable Seating Assembly. It will be appreciated that the first frame assembly 26 is given merely by way of example. Any frame assembly 26 which allows pivoting movement of the seat assembly 24 from an upright seating position to a folded seating position may be utilized without departing from the invention.

Figure 3:
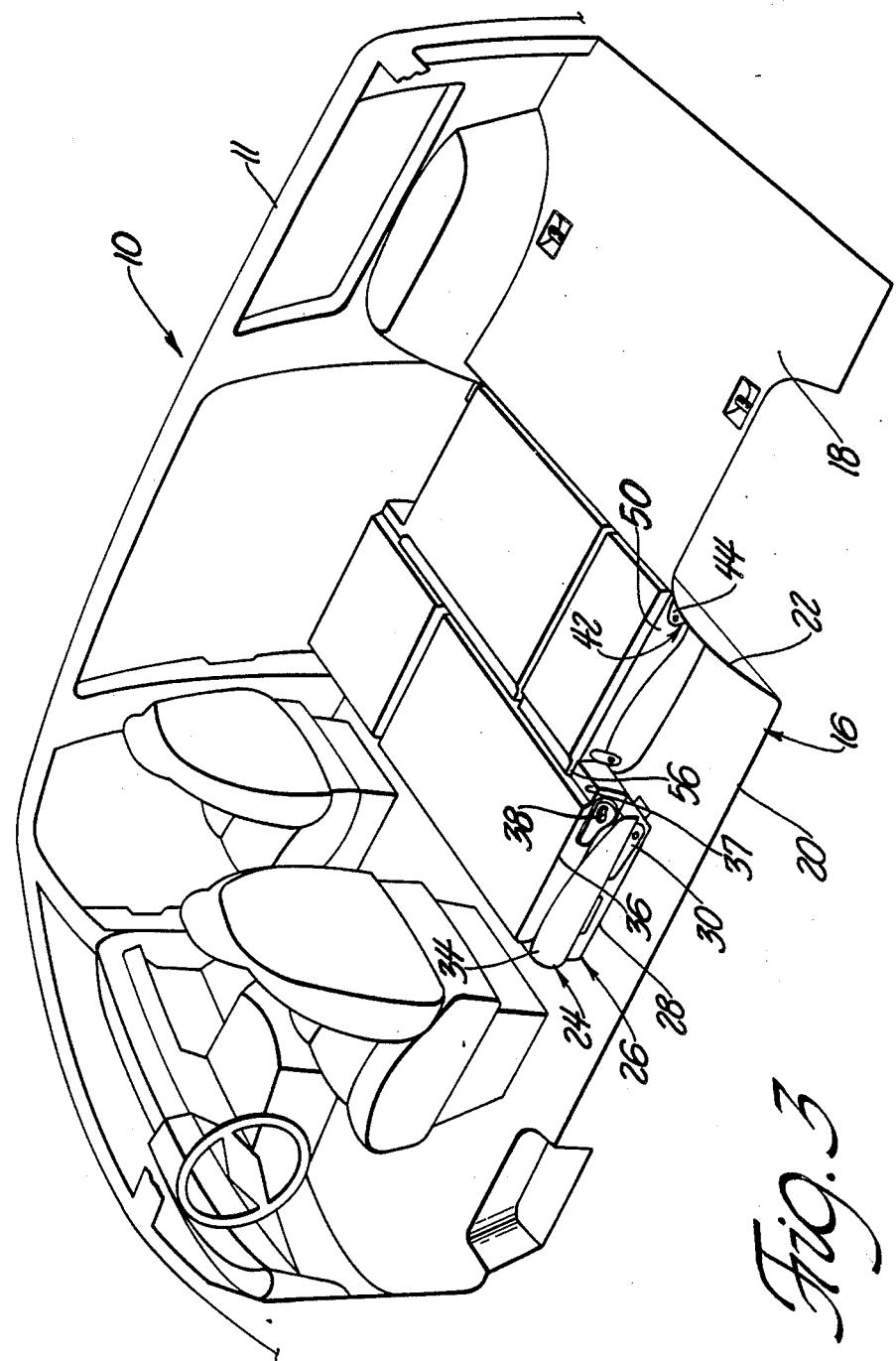
FIG. 3 is perspective view of the vehicle of FIG. 1 showing the seating assembly in the forwardly folded position.

The first seat assembly 24 further includes a lower seating portion or cushion 34. The cushion 34 is pivotally connected at the upward ends of the support brackets 30. The cushion 34 extends generally parallel with the forward seating area 20 of the vehicle floor 16. The cushion 34 is for carrying passengers in the vehicle 11. The first seat assembly 24 further includes a first upright back support portion 36. The first back support portion 36 has a recess 37 at the bottom thereof for receiving the second seat assembly 40 when the assembly 10 is in the forwardly folded position as will be more fully described subsequently. The upright back support portion 36 folds forward independently of the lower seating portion or cushion 34. Specifically, a latch mechanism 38 of any type well known in the art allows selective forward pivoting movement of the first upright back support portion 36. That is, the latch mechanism 38 locks its first upright back support portion 36 in the upright seating position until it is manually released. At this point, the upright back support portion 36 can be folded to the forwardly folded position. In the forwardly folded position, the upright back support portion 36 overlies the lower seating portion or cushion 34 (FIG. 3).

Figure 2:
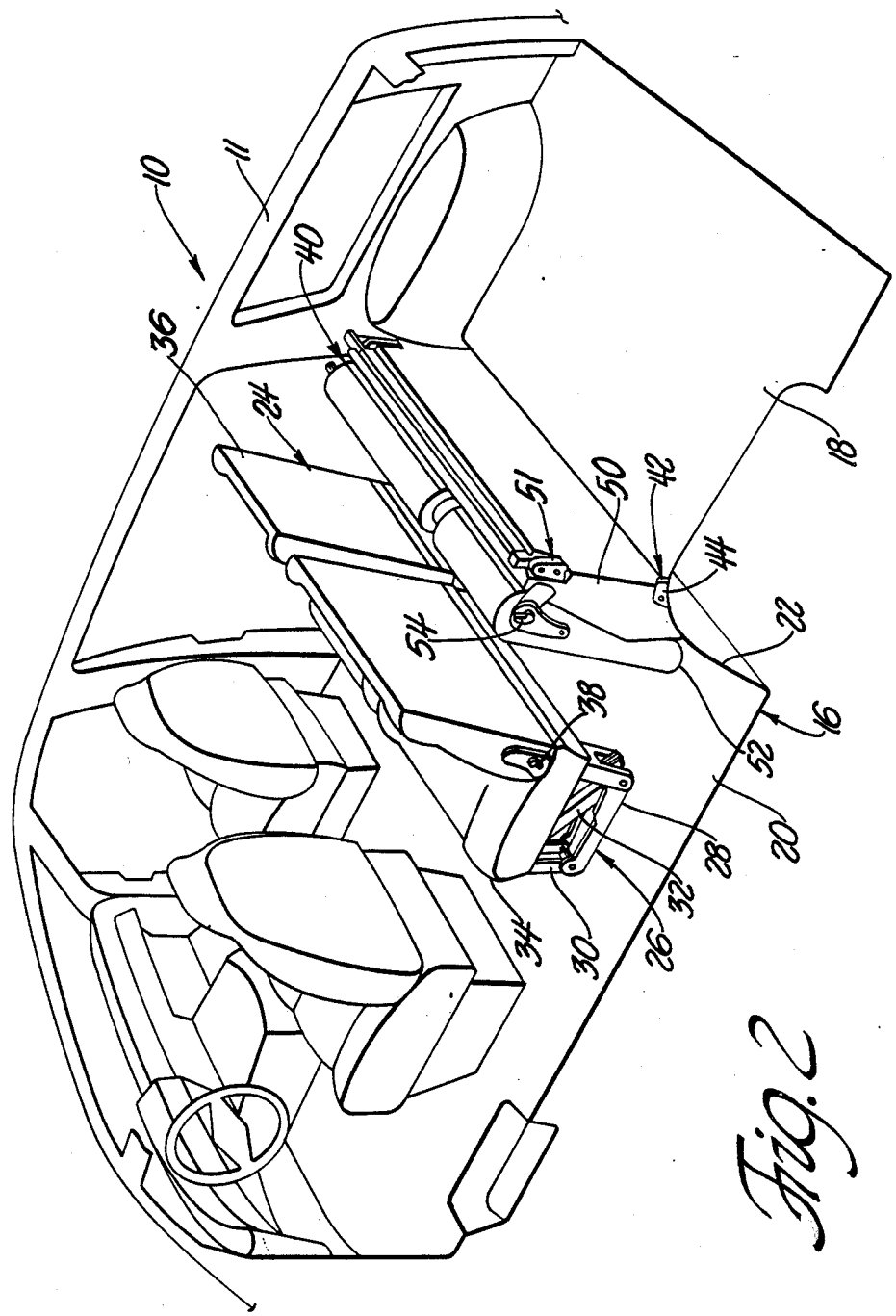
FIG. 2 is a perspective view of the vehicle of FIG. 1 showing the third seat in the intermediately forwardly folded position.

The assembly 10 further includes a second seat means or assembly generally indicated at 40. The second seat assembly 40 preferably refers to the second rear seat in the vehicle 11. That is, the second seat assembly 40 is located behind the first seat assembly 40 and is preferably the rearmost seat in the vehicle 11. The second seat assembly 40 is disposed over the load carrying platform 18 and secured thereto rearwardly of the first seat means 24 when in the upright seating position. The second seat assembly 40 is for pivoting between an upright seating position and a forwardly folded position. The second seat assembly 40 further can be moved to an intermediate folded position. This intermediate position is best viewed in FIG. 2. The intermediate position is particularly useful when the load carrying space needs to be increased slightly while maintaining a greater seating capacity.

Specifically, the second seat assembly 40 includes a second seat frame means or assembly generally indicated at 42. The second seat frame assembly 42 comprises a support member 44 fixedly secured to the vertical wall 22 of the vehicle floor 16. The fixed connection between the support member 44 and the vertical wall 22 is of any type well known in the art. The second seat frame assembly 42 further comprises a forward frame member 46 connected to the second lower seating portion 50 and pivotally secured to the support member 44 by a pivot pin 48.

The second seat assembly 40 further comprises a second lower seating portion 50 fixedly secured to the forward frame member 46 as previously described. The second lower seating portion 50 is, therefore, pivotal about the pivot pin 48 to the forwardly folded position. The second lower seating portion or cushion 50 includes an upper cushion surface and a lower load carrying surface. The lower load carrying surface normally forces downwardly toward the load carrying platform 18 when the second seat assembly 40 is in the upright seating position. The second cushion 50 also includes a lip 56 for engaging the recess 37 of the first upper back support portion 36 when the second seat assembly is in the forwardly folded position. Since the pivot pin 48 is mounted on the vertical wall 22 forwardly of the load carrying platform 18, the second seat frame assembly 42 does not extend upwardly from the second seat assembly 40 or the vehicle floor when the second seat assembly 40 is in the forwardly folded position. In the upright seating position, the second cushion 50 overlies the load carrying platform 18 of the vehicle floor 16.

The second seat means 40 further includes a second upright back support portion 52. The second upright back support 52 extends upwardly from the rearmost portion of the second cushion 50. The second upright back support portion 52 has a latch 54 thereon of any type well known in the art for permitting selective forward pivoting movement of the upright back support portion 52. The second upright back support portion 52 pivots independently of the cushion 50. In the forwardly folded position, the second lower seating portion 50 overlies the second upright back support portion 52 in the forward seating area 20 (FIG. 3).

The second seat assembly 40 is preferably locked to the load carrying platform 18 when in the upright seating position. This is accomplished by using any suitable locking mechanism generally indicated at 51. The preferable mechanism 51 for locking the seat assembly 40 in the upright seating position and the preferable second seat frame means is fully described in co-pending application Ser. No. 290,434, filed concurrently herewith, assigned to the assignee of the present invention, and entitled Forward Pivoting Seat Assembly.

To fold the seats forwardly to the forwardly folded position, the first frame assembly 26 is folded forwardly. Specifically, cross member 32 is released and allows the support brackets 30 to fold forwardly. The first latch mechanism 38 is then released to allow the first upright back support portion 36 to fold forwardly and overly the first cushion 34, as best viewed in FIG. 3. In this position, the recess 37 is presented upwardly for receiving the lip 56 of the second seat means 40 as will be described subsequently. To fold the second seat means 40 forward, the latch mechanism 54 is released to allow the second back rest support portion 52 to fold over the second lower seating portion 50. The second lower seating portion 50 and second upper back rest portion 52 are then pivoted about the pivot point 48 and into the forward seating area 20 of the floor 16. The second seat 40 is pivoted until the lip 56 engages the recess 37 of the second seat means 24. In this configuration, the first seat means 24 and second seat means 40 are disposed in the forward seating area 20 of the floor 16. Further, the upper back support 36 of the first seat means 24 and the second lower seating portion 50 of the second seat means comprise an extension of the load carrying platform 18 (as best viewed in FIG. 3). That is, the first back support 36 and the bottom or load carrying surface of the second cushion are substantially flush with the load carrying platform 18 of the vehicle floor 16. Thus, the load carrying platform 18 is substantially lengthened and the area for cargo carrying is greatly increased.

Alternatively, the first seat assembly can remain in the upright seating position. The second seat assembly 40 can be folded forwardly to the intermediate position (as best viewed in FIG. 2). In this position, the first seat assembly can be used to carry passengers while the second seat assembly 40 is lifted off the load carrying platform 18 to increase the cargo carrying capacity of the vehicle 11. To fold the second seat assembly 40 to the intermediate position, the latch mechanism 54 is release to allow the second back rest support portion 52 to fold over the second lower seating portion 50. The second lower seating portion 50 and the second upper back rest portion 52 are then pivoted about the pivot point 40 until they ar substantially vertical.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A vehicle seat assembly (10) of the type to be folded forwardly in a vehicle to increase the load carrying capacity of the vehicle, said assembly comprising:
    a vehicle (11) including front (12) and rear (14) wheels and a floor (16) with a raised load carrying platform (18) over said rear wheels (14) and extending rearwardly therefrom and a forward seating area (20) forward of said rear wheel (14) and lower in height than said raised load carrying platform (18);
    first seat means (24) fixedly secured to said forward seating area (20) of said floor (16) for pivoting between an upright seating position and a forwardly folded load carrying portion and including a first lower seating portion (34) and a first upright back support portion (36);
    second seat means (40) fixedly secured on said load carrying platform (18) rearwardly of said first seat means (24) for pivoting between an upright seating portion and a forwardly folded position and including a second lower seating portion (50) and a second upright back support portion (52);
    said assembly characterized by said first seat means (24) including first frame means (26) for permitting forward folding movement of said first seat means (24) to the forwardly folded position wherein said first upright back support portion (36) overlies said first lower seating portion (34) and said second seat means (40) including second seat frame means (42) for permitting pivoting movement of said second seat means (40) to the forwardly folded position wherein said second lower seating portion (50) overlies said second upright back support portion (52) such that both of said first (24) and said second (40) seat means are disposed in said forward seating area (20) when each of said first (24) and second (40) seat means are in the forwardly folded portion with each of said back support (36) of said first seat means (24), said second lower seating portion (50) of said second seat means (40), and said load carrying platform (18) all being substantially flush to comprise an extension of said load carrying platform (18).

2. An assembly as set forth in claim 1 further characterized by said second lower seating portion (50) including a lip (56) extending outwardly therefrom and said first back support portion (36) including a recess (37), said lip (56) engaging said recess (37) when both of said first (24) and said second (40) seat means are in the forwardly folded position.

3. An assembly as set forth in claim 2 further characterized by said first frame means (26) comprising a base (28) adapted for fixed connection to the forward seating area (20) of the vehicle floor (16) and a pair of support brackets (30) pivotally connected to said base (28) and extending upwardly therefrom, each of said support brackets (30) pivotally connected to said first lower seating portion (34).

4. An assembly as set forth in claim 3 further characterized by said first frame means (26) further comprising a cross member (32) pivotally connected to said base (28) and pivotally connected to one of said support brackets (30), said cross member (32) allowing selective pivoting movement of said support brackets (30) between the upright seating position and the forwardly folded position.

5. An assembly as set forth in claim 2 further characterized by said second frame means (42) comprising a support member (44) adapted to be fixedly secured to said load carrying platform (18) of the vehicle floor (16) and a forward frame member (46) fixedly secured to said second lower seating portion (50), said support member (44) and said forward frame member (46) pivotally connected (48) together for allowing forward pivoting movement of said second seat means (40).

* * * * *